United States Patent
Geibel et al.

(10) Patent No.: US 9,946,563 B2
(45) Date of Patent: Apr. 17, 2018

(54) BATCH SCHEDULER MANAGEMENT OF VIRTUAL MACHINES

(75) Inventors: Jonathan Eric Geibel, Burbank, CA (US); Jeffrey M. Jordan, Valley Village, CA (US); Scott Lane Burris, Palmdale, CA (US); Kevin Christopher Constantine, Sherman Oaks, CA (US)

(73) Assignee: Disney Enterprises, Inc., Burbank, CA (US)

( * ) Notice: Subject to any disclaimer, the term of this patent is extended or adjusted under 35 U.S.C. 154(b) by 801 days.

(21) Appl. No.: 13/401,759

(22) Filed: Feb. 21, 2012

(65) Prior Publication Data

US 2013/0219385 A1 Aug. 22, 2013

(51) Int. Cl.
*G06F 9/455* (2006.01)
*G06F 9/50* (2006.01)

(52) U.S. Cl.
CPC ........ *G06F 9/45558* (2013.01); *G06F 9/5077* (2013.01); *G06F 9/5088* (2013.01); *G06F 2009/45562* (2013.01)

(58) Field of Classification Search
CPC .................................................. G06F 9/45558
USPC ............................................................ 718/1
See application file for complete search history.

(56) References Cited

U.S. PATENT DOCUMENTS

| | | | | |
|---|---|---|---|---|
| 2008/0163239 | A1* | 7/2008 | Sugumar | G06F 9/5088 718/105 |
| 2010/0057881 | A1* | 3/2010 | Corry et al. | 709/216 |
| 2010/0274890 | A1* | 10/2010 | Patel et al. | 709/224 |
| 2010/0287548 | A1* | 11/2010 | Zhou et al. | 718/1 |
| 2010/0325191 | A1* | 12/2010 | Jung | G06F 15/16 709/202 |
| 2011/0131569 | A1* | 6/2011 | Heim | G06F 9/45558 718/1 |
| 2011/0167421 | A1* | 7/2011 | Soundararajan | G06F 9/5077 718/1 |
| 2011/0202640 | A1* | 8/2011 | Pillutla | 709/221 |
| 2011/0314470 | A1* | 12/2011 | Elyashev et al. | 718/1 |
| 2012/0030349 | A1* | 2/2012 | Sugai | 709/224 |
| 2013/0019016 | A1* | 1/2013 | Anderson et al. | 709/226 |
| 2013/0031545 | A1* | 1/2013 | Choudhury et al. | 718/1 |
| 2013/0179881 | A1* | 7/2013 | Calder | G06F 9/5072 718/1 |

OTHER PUBLICATIONS

Ahmed A. Soror, Umar Farooq Minhas, Ashraf Aboulnaga, Kenneth Salem, Peter Kokosielis, Sunil Kamath, Automatic Virtual Machine Configuration for Database Workloads, ACM Transactions on Database Systems, vol. 35, No. 1, Article 7, Publication date: Feb. 2010.*

(Continued)

*Primary Examiner* — Charlie Sun

(74) *Attorney, Agent, or Firm* — Patent Ingenuity, P.C.; Samuel K. Simpson

(57) ABSTRACT

A batch scheduler receives a task. Further, a processor, at the batch scheduler, generates a virtual machine corresponding to the task. In addition, the virtual machine is deployed from the batch scheduler to a compute node. The task is also dispatched from the batch scheduler to the virtual machine at the compute node.

23 Claims, 8 Drawing Sheets

(56) References Cited

OTHER PUBLICATIONS

Xuxian Jiang, Dongyan Xu, SODA: a Service-On-Demand Architecture for Application Service Hosting Utility Platforms, 2003, Proceedings of the 12th IEEE International Symposium on High Performance Distributed Computing (HPDC'03).*

Borja Sotomayor, Kate Keahey, Ian Foster, Combining Batch Execution and Leasing Using Virtual Machines, HPDC'08, Jun. 23-27, 2008.*

Capit, et al., A batch scheduler with high level components, 2005 IEEE International Symposium on Cluster Computing and the Grid.*

David Jackson, Quinn Snell, and Mark Clement, Core Algorithms of the Maui Scheduler, LNCS 2221, pp. 87-102, 2001, Springer-Verlag Berlin Heidelberg 2001.*

Emeneker et. al., Dynamic Virtual Clustering with Xen and Moab, ISPA 2006 Ws, LNCS 4331, pp. 440-451, 2006, Springer-Verlag Berlin Heidelberg 2006.*

Wan et. al., A Batch Scheduler for the Intel Paragon with a Non-contiguous Node Allocation Algorithm, Lecture Notes in Computer Science vol. 1162, 1996, pp. 48-64.*

* cited by examiner

BATCH SCHEDULER MANAGEMENT OF VIRTUAL MACHINES

BACKGROUND

1. Field

This disclosure generally relates to the field of computer systems. More particularly, the disclosure relates to batch scheduling.

2. General Background

Many current computer systems utilize batch scheduling to execute a series of programs without manual intervention. Batch scheduling allows large sets of data to be processed in batches. Current batch scheduling systems typically submit tasks directly to the base operating system of a compute node that is to run the task or to a virtual machine ("VM") that is not directly managed by the batch scheduling system itself. The compute node may be a computing device, a program executed on a computing device, an operating system, or the like. Further, a computing device, e.g., a server, may have one or more compute nodes. When a compute node is resource constrained, e.g., by limitations regarding a central processing unit ("CPU"), memory, or the like, tasks may be discarded to free up resources and rerun on another compute node at a later point. Most batch scheduling systems in high performance computing are utilized for processing batches of large amounts of data, which does not adequately scale the batch processing to optimize utilization of resources. For example, the current batch processing systems often overutilize certain resources, but underutilize other resources. Many servers perform intensive processing tasks while other processors perform very little processing.

SUMMARY

In one aspect of the disclosure, a computer program product is provided. The computer program product includes a computer readable medium having a computer readable program stored thereon. The computer readable program when executed on a computer causes the computer to receive a task at a batch scheduler. Further, the computer readable program when executed on the computer causes the computer to generate, at the batch scheduler, a virtual machine corresponding to the task. In addition, the computer readable program when executed on the computer causes the computer to deploy the virtual machine from the batch scheduler to a compute node. The computer readable program when executed on the computer also causes the computer to dispatch the task from the batch scheduler to the virtual machine at the compute node.

In another aspect of the disclosure, a process is provided. The process receives a task at a batch scheduler. Further, the process generates with a processor, at the batch scheduler, a virtual machine corresponding to the task. In addition, the process deploys the virtual machine from the batch scheduler to a compute node. The process also dispatches the task from the batch scheduler to the virtual machine at the compute node.

In yet another aspect of the disclosure, a system is provided. The system includes a batch scheduler configured to receive a task, generate a virtual machine corresponding to the task, deploy the virtual machine to a compute node, and dispatch the task to the virtual machine at the compute node.

In another aspect of the disclosure, a computer program product is provided. The computer program product includes a computer readable medium having a computer readable program stored thereon. The computer readable program when executed on a computer causes the computer to receive, at a compute node, a virtual machine from a batch scheduler. Further, the computer readable program when executed on the computer causes the computer to receive, at the compute node, a task from the batch scheduler. The task corresponds to the virtual machine. In addition, the computer readable program when executed on the computer causes the computer to provide, at the compute node, resources to the virtual machine to process the task.

In yet another aspect of the disclosure, a process is provided. The process receives, at a compute node, a virtual machine from a batch scheduler. Further, the process receives, at the compute node, a task from the batch scheduler. The task corresponds to the virtual machine. In addition, the process provides, at the compute node, resources to the virtual machine to process the task.

In another aspect of the disclosure, a system is provided. The system includes a processor. Further, the system includes a reception module that receives, at a compute node, a virtual machine from a batch scheduler and a task from the batch scheduler. The task corresponds to the virtual machine. In addition, the system includes a processor that provides, at the compute node, resources to the virtual machine to process the task.

BRIEF DESCRIPTION OF THE DRAWINGS

The above-mentioned features of the present disclosure will become more apparent with reference to the following description taken in conjunction with the accompanying drawings wherein like reference numerals denote like elements and in which:

FIG. 3A illustrates the batch scheduling configuration generating VMs for received tasks.

FIG. 3B illustrates the batch scheduling configuration of FIG. 3A in which the VMs are deployed onto each of the host compute nodes.

FIG. 3C illustrates the batch scheduling configuration of FIG. 3B in which the corresponding task for each VM has now been dispatched to that VM on a host compute node.

DETAILED DESCRIPTION

A batch scheduler with a plurality of VMs may be utilized to manage resources for a plurality of compute nodes. A VM is a software implementation of a computing device that executes programs like a physical computing device, but in a virtual manner. The batch scheduler generates a plurality of VMs such that each individual task is assigned to its own VM. The batch scheduler then dispatches each VM to run on a given host compute node. Further, the batch scheduler may choreograph the movement of the tasks across compute nodes to optimize hardware utilization as well as ensure the resources are assigned to the right tasks based on computed priorities. In other words, the batch scheduler provides coordination between the generated VMs to optimize resource allocation. The batch scheduler is able to perform this coordination because the batch scheduler may have information such as a global view of all work that has been scheduled and is waiting to execute, a global view of all tasks that are currently running, a live view of the resources that all active processes are consuming, the list of dynamically computed priorities for all tasks, and the list of all available compute resources and their associated features and abilities. The batch scheduler may perform dynamic rebalancing of the load of VMs to ensure that the highest priority tasks are running at all times or most of the time.

If a host compute node is or becomes resource bound, i.e., enough resources are not available for processing efficiently or processing at all, the batch scheduler may either migrate resources between VMs on a single host compute node or migrate VMs between physical servers. In contrast with discarding active processes and rerunning a task on a different host compute node, the batch scheduler may pause a VM. Accordingly, work already performed by an active task does not have to be lost.

The batch scheduler, host compute nodes, VMs, and other elements described herein may be used to generate or modify an image or a sequence of images for an animation. For example, the elements described herein may be used for modeling objects (shaping geometry), layout, rigging, look development, stereoscopic creation and manipulation (depth perception), animation (movement, computational dynamics), lighting, rendering, and/or color correction.

Figure 1:
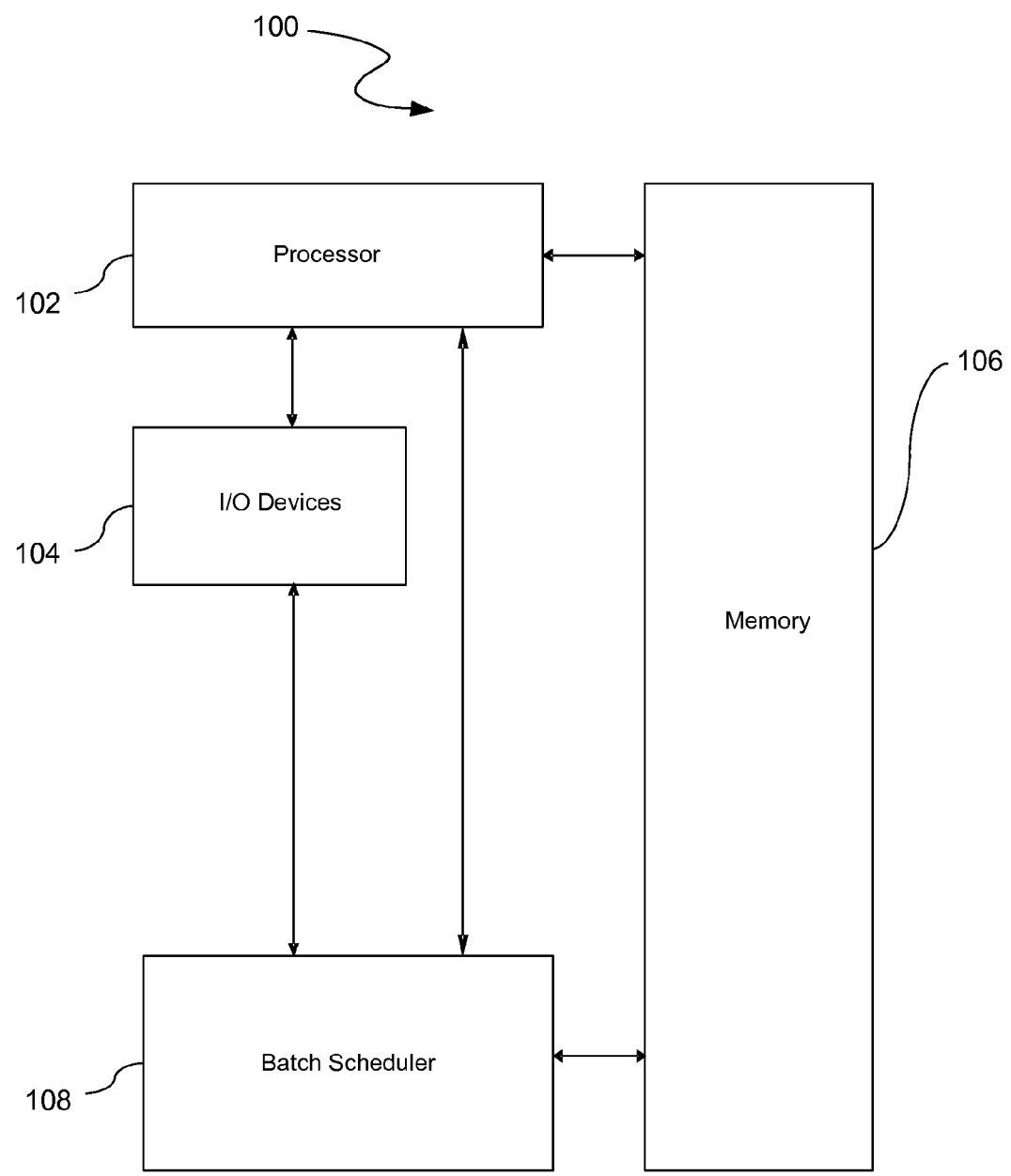
FIG. 1 illustrates a system that may be utilized to perform batch scheduling.

FIG. 1 illustrates a system 100 that may be utilized to perform batch scheduling. In one aspect, the system 100 is implemented utilizing a general purpose computer or any other hardware equivalents. Thus, the system 100 comprises a processor 102, a memory 106, e.g., random access memory ("RAM") and/or read only memory (ROM), a batch scheduler 108 that performs batch scheduling, and various input/output devices 104, (e.g., audio/video outputs and audio/video inputs, storage devices, including but not limited to, a tape drive, a floppy drive, a hard disk drive or a compact disk drive, a receiver, a transmitter, a speaker, a display, an image capturing sensor, e.g., those used in a digital still camera or digital video camera, a clock, an output port, a user input device (such as a keyboard, a keypad, a mouse, and the like, or a microphone for capturing speech commands)). In one aspect, the batch scheduler 108 is implemented as a module. Various other configurations for the batch scheduler 108 may be utilized.

It should be understood that the batch scheduler 108 may be implemented as one or more physical devices that are coupled to the processor 102. For example, the batch scheduler 108 may include a plurality of modules. Alternatively, the batch scheduler 108 may be represented by one or more software applications (or even a combination of software and hardware, e.g., using application specific integrated circuits (ASIC)), where the software is loaded from a storage medium, (e.g., a magnetic or optical drive, diskette, or non-volatile memory) and operated by the processor 102 in the memory 106 of the system 100. As such, the batch scheduler 108 (including associated data structures) of the present disclosure may be stored on a computer readable medium, e.g., RAM memory, magnetic or optical drive or diskette and the like.

The system 100 may be utilized to implement any of the configurations herein. In another aspect, the processor 102 is the batch scheduler 108. Accordingly, in such an aspect, a batch scheduler 108 that is separate from the processor 102 is unnecessary. FIG. 1 provides an example of an implementation of a batch scheduling system. However, the batch scheduling system is not limited to any particular model and may be implemented with similar and/or different components from this example.

Figure 2:
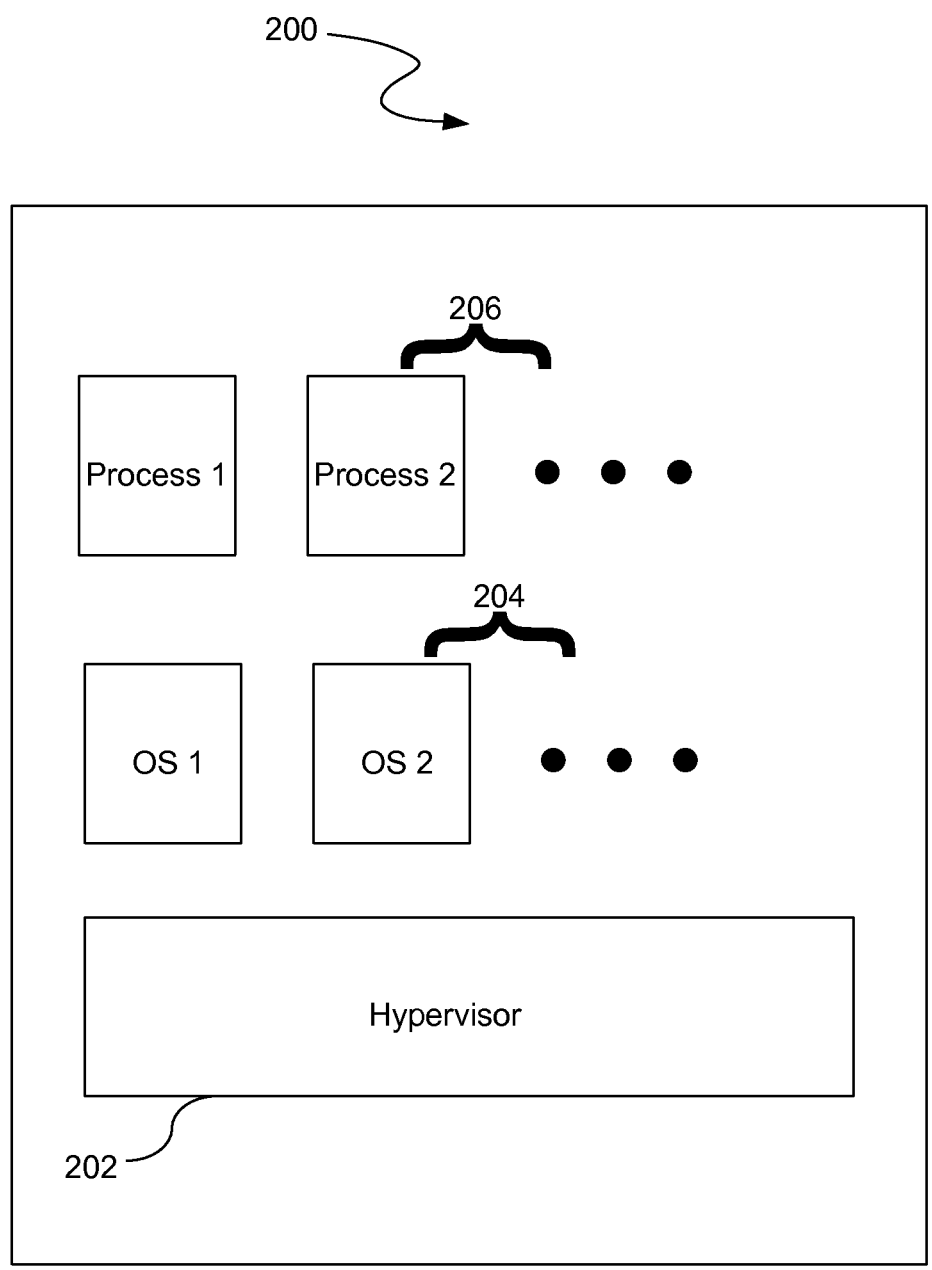
FIG. 2 illustrates an example of a host compute node.

The batch scheduler 108 of the system 100 illustrated in FIG. 1 may interact with one or more host compute nodes to dispatch various tasks to such host compute nodes for processing. FIG. 2 illustrates an example of a host compute node 200. The host compute node 200 may be a hardware device, e.g., a server, that has a hypervisor 202. The hypervisor 202 is a virtual machine manager that allows a plurality of operating systems 204 to run concurrently on the host compute node 200. The hypervisor 202 provides virtual hardware resources to the plurality of operating systems 204 through a virtual operating platform and manages execution of the plurality of operating systems 204. Further, each of the plurality of operating systems 204 may be responsible for executing some or all of a plurality of tasks 206.

Figure 3A:
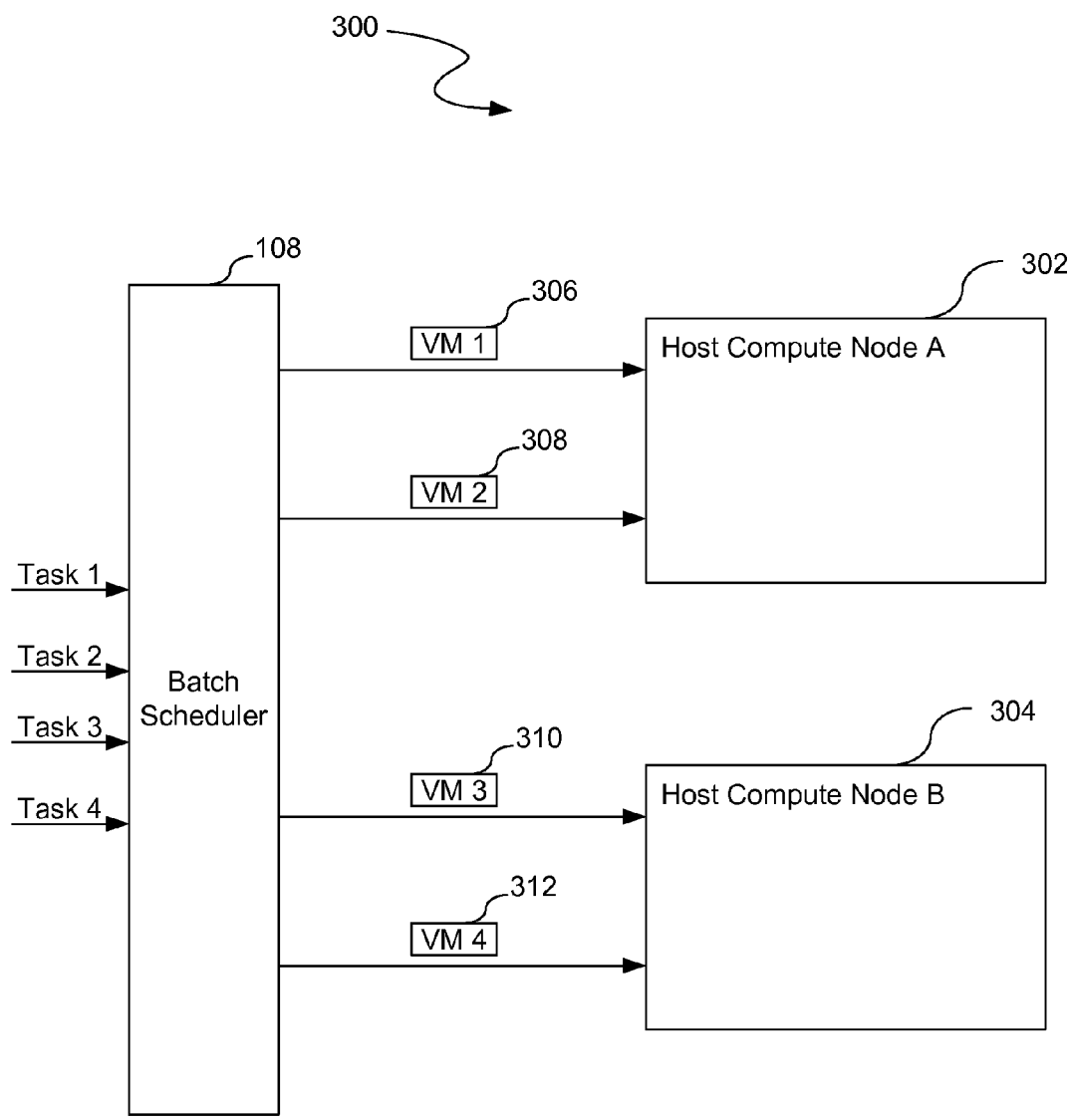
FIGS. 3A-3C illustrate a batch scheduling configuration.
Figure 3B:
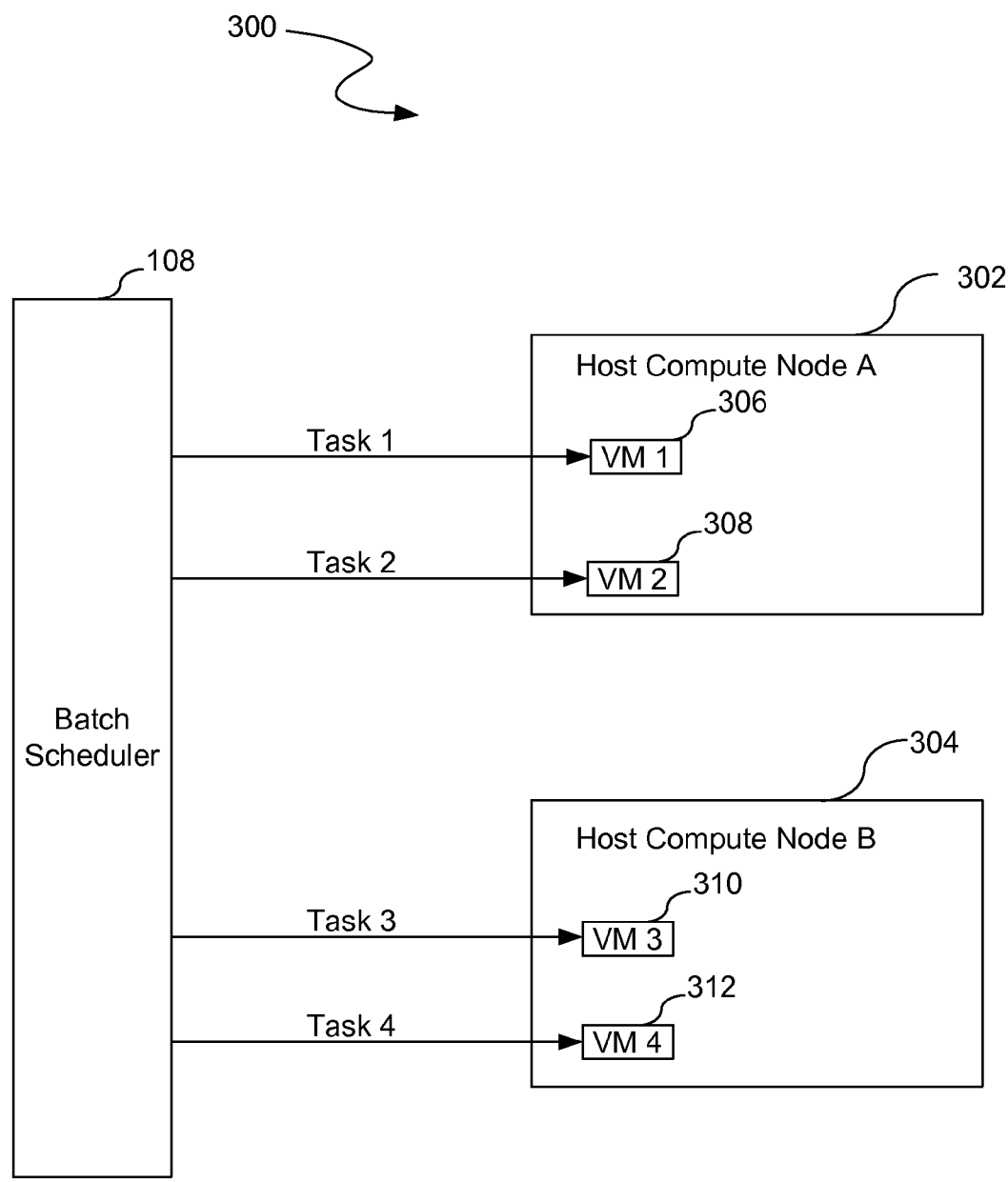
Figure 3C:
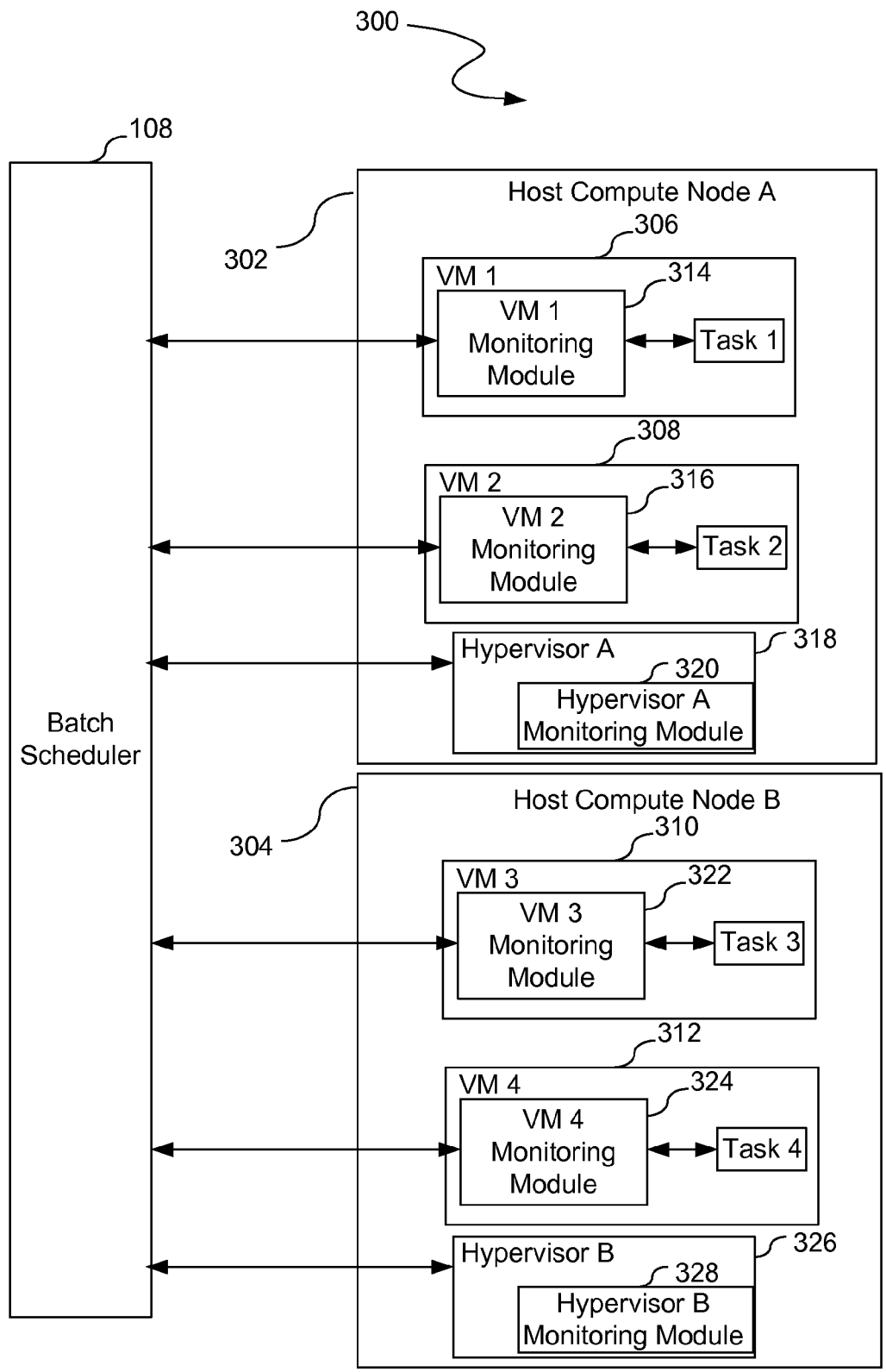

FIGS. 3A-3C illustrate a batch scheduling configuration 300. FIG. 3A illustrates the batch scheduling configuration 300 generating VMs for received tasks. The batch scheduling configuration 300 includes the batch scheduler 108 and a plurality of host compute nodes. As an example, the batch scheduling configuration 300 includes a host compute node A 302 and a host compute node B 304. The host compute nodes may be servers or any other computing devices that may be utilized to perform tasks. Further, as an example, the batch scheduler 108 may receive a first task, a second task, a third task, and a fourth task. In one aspect, the batch scheduler 108 generates a VM for each task. Accordingly, the batch scheduler 108 generates a first VM 306, a second VM 308, a third VM 310, and a fourth VM 312. Further, the batch scheduler 108 may generate each VM according to the appropriate environment. For example, if the host compute node A 302 supports a first operating system and a second operating system, the batch scheduler 108 may generate the first VM 306 to operate according to the first operating system and the second VM 308 to operate according to the second operating system. Accordingly, the batch scheduling configuration 300 is platform independent.

FIG. 3B illustrates the batch scheduling configuration 300 of FIG. 3A in which the VMs are deployed by the batch scheduler 108 onto each of the host compute nodes. For example, the first VM 306 and the second VM 308 are deployed to the host compute node A 302, whereas the third VM 310 and the fourth VM 312 are deployed to the host compute node B 304. Further, the batch scheduler 108 dispatches each of the tasks into the corresponding VM. For example, the batch scheduler 108 dispatches the first task into the first VM 306 and the second task into the second VM 308 on the host compute node A 302. As another example, the batch scheduler 108 dispatches the third task into the third VM 310 and the fourth task into the fourth VM 312 on the host compute node B 304.

FIG. 3C illustrates the batch scheduling configuration 300 of FIG. 3B in which the corresponding task for each VM has been dispatched to that VM on a host compute node. For example, the first task is performed by the first VM 306, the second task is performed by the second VM 308, the third task is performed by the third VM 310, and the fourth task is performed by the fourth VM 312.

In one aspect, a VM monitoring module may be assigned to each VM instance such that the VM monitoring module may provide bidirectional communication between the batch scheduler 108 and the VM in addition to bidirectional communication between the VM and the task that the VM is assigned to process. The VM monitoring module may proactively alert the batch scheduler 108 of potential changes in resource requirements for the task associated with the VM that it is assigned to monitor. As a result, the batch scheduler 108 may make an informed decision when reallocating resources.

For example, the first VM 306 may have a first monitoring module 314 that provides bidirectional communication between the batch scheduler 108 and the first VM 306 in addition to bidirectional communication between the first VM 306 and the first task. If the first task has a change in resource requirements, the first monitoring module 314 may detect such change and proactively alert the batch scheduler 108. The batch scheduler 108 may then shift resources from another VM on the host compute node A 302 or from a different host compute node such as the host compute node B 304 so that the first task may be processed with optimal resources. Alternatively, the batch scheduler 108 may migrate the first VM 306 and the first task to a different compute node such as the second host compute node B 304 so that the first task may be processed with optimal resources. This dynamic reallocation and/or migration allow for preemptive resource management that helps minimize or reduce utilization of resources that are constrained and maximize or increase utilization of resources that are available. As other examples, the second VM 308 may have a second VM monitoring module 316, the third VM 310 may have a third VM monitoring module 322, and the fourth VM 312 may have a fourth VM monitoring module 324.

In another aspect, a hypervisor monitoring module may run on a hypervisor of a host compute node to perform monitoring and actions on behalf of the batch scheduler 108. By accessing the internal components of the hypervisor directly, the batch scheduler 108 may better manage VM instances. For example, a hypervisor A 318 running on the host compute node A 302 may have a hypervisor A monitoring module 320 that monitors the hypervisor A 318 and communicates with the batch scheduler 108. The hypervisor A monitoring module 320 may provide the batch scheduler 108 with global system information regarding the host compute node A 302. Such global information may assist the batch scheduler 108 with dynamic reallocation and/or migration of the first task and/or the second task. As another example, a hypervisor B 326 running on the host compute node B 304 may have a hypervisor B monitoring module 328 that monitors the hypervisor B 326 and communicates with the batch scheduler 108.

In another aspect, the hypervisor monitoring module may be aware of native processes, which are not owned or scheduled by the batch scheduler 108, that are running on the host compute node. As a result, underlying processes may be considered to avoid disruption.

Either or both of the VM monitoring module and the hypervisor monitoring module may be utilized for a host compute node. In one aspect, either or both of the VM monitoring module and the hypervisor monitoring module may be utilized to passively monitor trends in resource consumption of VM instances. Based upon such trend monitoring, either or both of the VM monitoring module and the hypervisor monitoring module may attempt to predict the future resource needs of VMs. This information may then be utilized by the batch scheduler 108 to make the most informed decision on how to coordinate the VMs across compute resources in the most optimal manner.

The batch scheduling configuration 300 illustrated in FIGS. 3A-3C allow actions to be performed on VMs to optimize resource utilization. For example, VMs may be monitored to detect when an executing task is likely to exceed the VM's resource reservation. The size of the VM may be dynamically increased to accommodate such an occurrence. For instance, the hypervisor may look at the CPU load on a VM and automatically add more processors to the VM if the load exceeds the number of processors currently allocated.

Further, as another example of optimizing resource allocation, if a task is under-utilizing its resource reservation, the VM may be dynamically decreased in size to free up more resources on the hypervisor. For instance, if the memory requested for a task is much greater than the memory actually being consumed by the VM, the hypervisor could shrink the memory available to the VM to free up the memory for access by other VMs on the system.

In addition, as another example of optimizing resource allocation, the batch scheduler 108 may pause a VM, move the VM to another hypervisor, and resume the VM without losing any work performed by the executing task. As a result, the batch scheduler 108 may more optimally pack the VMs onto host compute nodes for processing.

As yet another example of optimizing resource allocation, if a process needs more resources than it reserved, and resources are constrained on the compute host, a VM may be paused, moved to another hypervisor, resized, and resumed. Such actions may be performed without losing any work from the execution instance.

Further, as another example of optimizing resource allocation, the batch scheduler 108 may dynamically repack VMs into the hypervisors. If many small tasks are scattered across a plurality of hypervisors, those small tasks may be consolidated into fewer hypervisors. As a result, resources may be freed up for utilization with other running tasks. Alternatively, the batch scheduler 108 may free up enough resources on a particular hypervisor to make room for a larger job that needs to run. In addition, as another example of optimizing resource allocation, the batch scheduler 108 may pause VMs with tasks that have a lower priority to free up resources for tasks that have a higher priority work that are submitted to the batch scheduler 108. After the higher priority work is completed, the lower priority VMs may be resumed so that they may continue where they left off.

As yet another example of optimizing resource allocation, host compute nodes may be taken offline for hardware maintenance purposes. The batch scheduler 108 may then coordinate movement of VMs off of those physical host compute nodes so that maintenance may be performed on the physical hardware.

By encapsulating each individual task inside its own VM with subsystems that allows bidirectional communication between different compute layers, the batch scheduler configuration 300 illustrated in FIGS. 3A-3C dynamically rebalances the load of VMs across hypervisors. The batch scheduler configuration 300 dynamically re-provisions tasks based upon the resources needed by those tasks to ensure that only the resources needed by those tasks are allocated. The batch scheduler configuration 300 increases utilization of compute resources in a network and ensures that compute resources are allocated to the highest priority tasks. In one aspect, the batch scheduler configuration 300 performs dynamic rebalancing through an automated system. In other words, manual rebalancing of resources or VMs by humans is not required.

Figure 4:
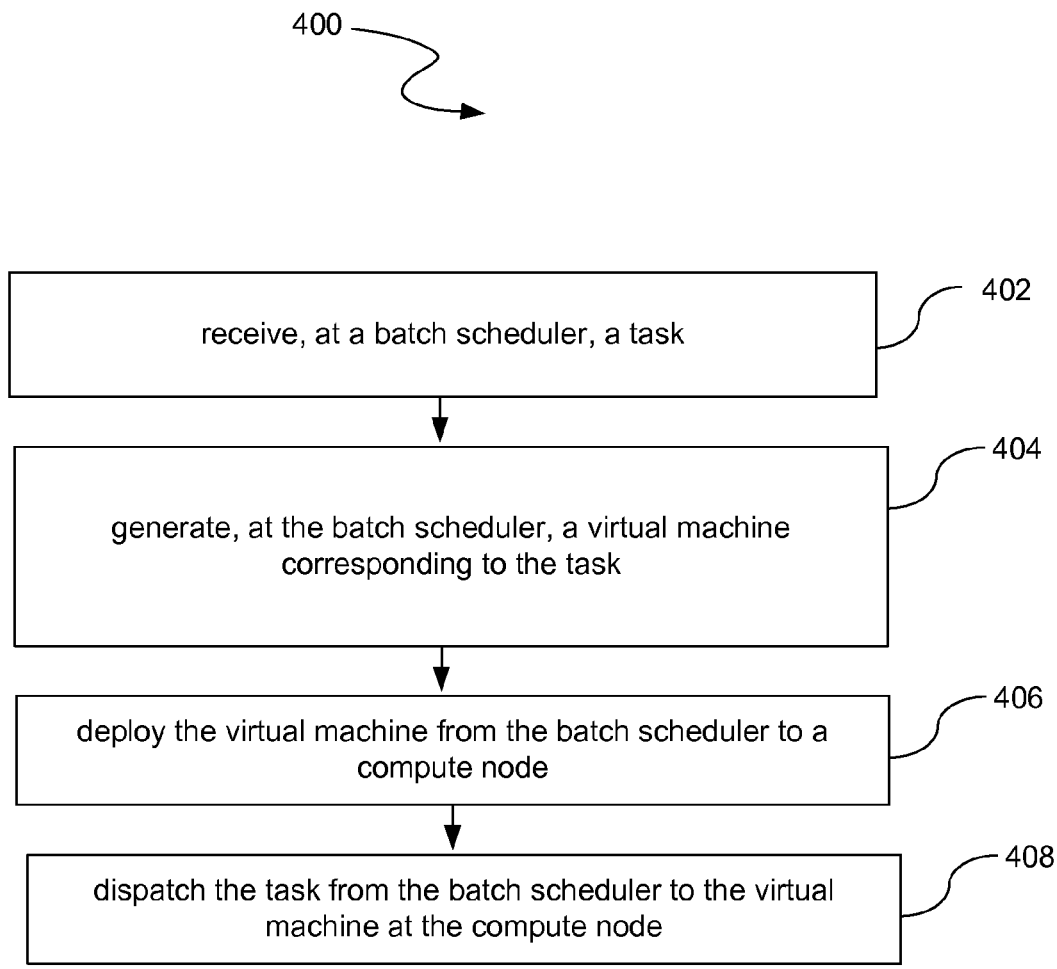
FIG. 4 illustrates a process that may be utilized by the batch scheduler illustrated in FIG. 1 to manage a virtual machine.

FIG. 4 illustrates a process 400 that may be utilized by the batch scheduler 108 illustrated in FIG. 1 to manage a virtual machine. At a process block 402, the process 400 receives, at a batch scheduler, a task. Further, at a process block 404, the process 400 generates with a processor, at the batch scheduler, a virtual machine corresponding to the task. In addition, at a process block 406, the process 400 deploys the virtual machine from the batch scheduler to a compute node. At a process block 408, the process 400 also dispatches the task from the batch scheduler to the virtual machine at the compute node.

Figure 5:
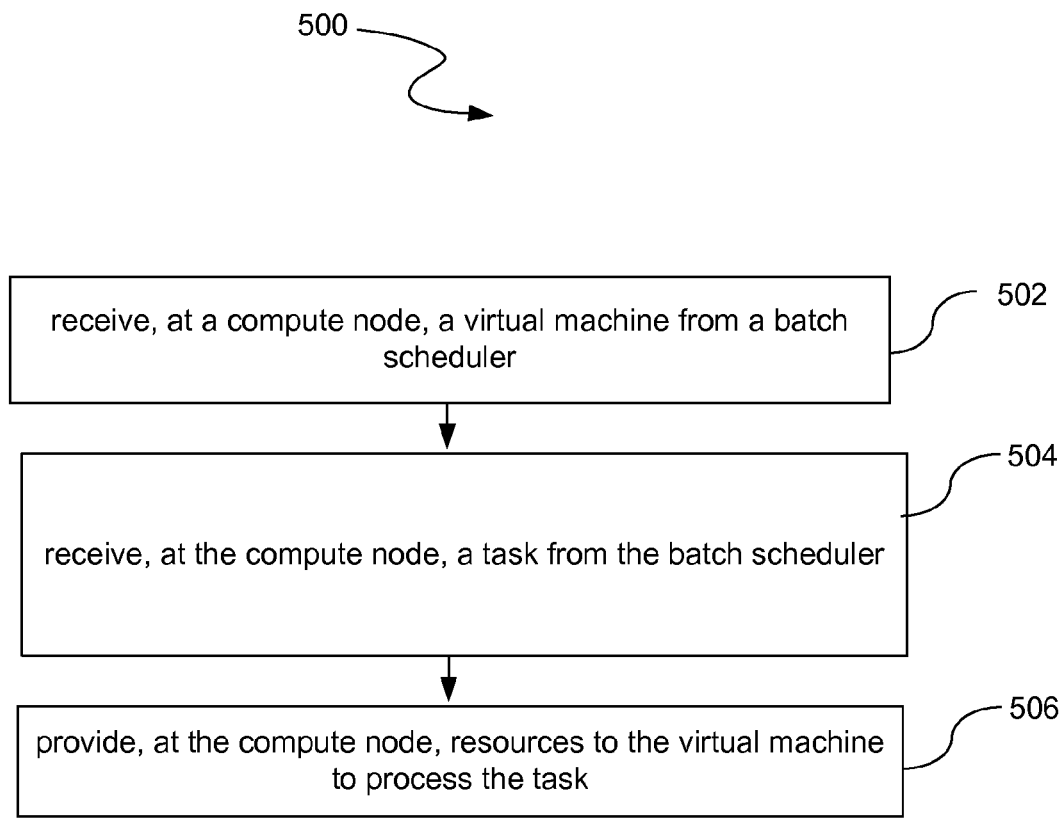
FIG. 5 illustrates a process that may be utilized by the host compute node illustrated in FIG. 2 to allocate resources for the virtual machine received from the batch scheduler illustrated in FIG. 1.

Further, FIG. 5 illustrates a process 500 that may be utilized by the host compute node illustrated in FIG. 2 to allocate resources for the virtual machine received from the batch scheduler 108 illustrated in FIG. 1. At a process block 502, the process 500 receives, at a compute node, a virtual machine from a batch scheduler. Further, at a process block 504, the process 500 receives, at the compute node, a task from the batch scheduler. The task may correspond to the virtual machine. In addition, at a process block 506, the process 500 provides, at the compute node, resources to the virtual machine to process the task.

Figure 6:
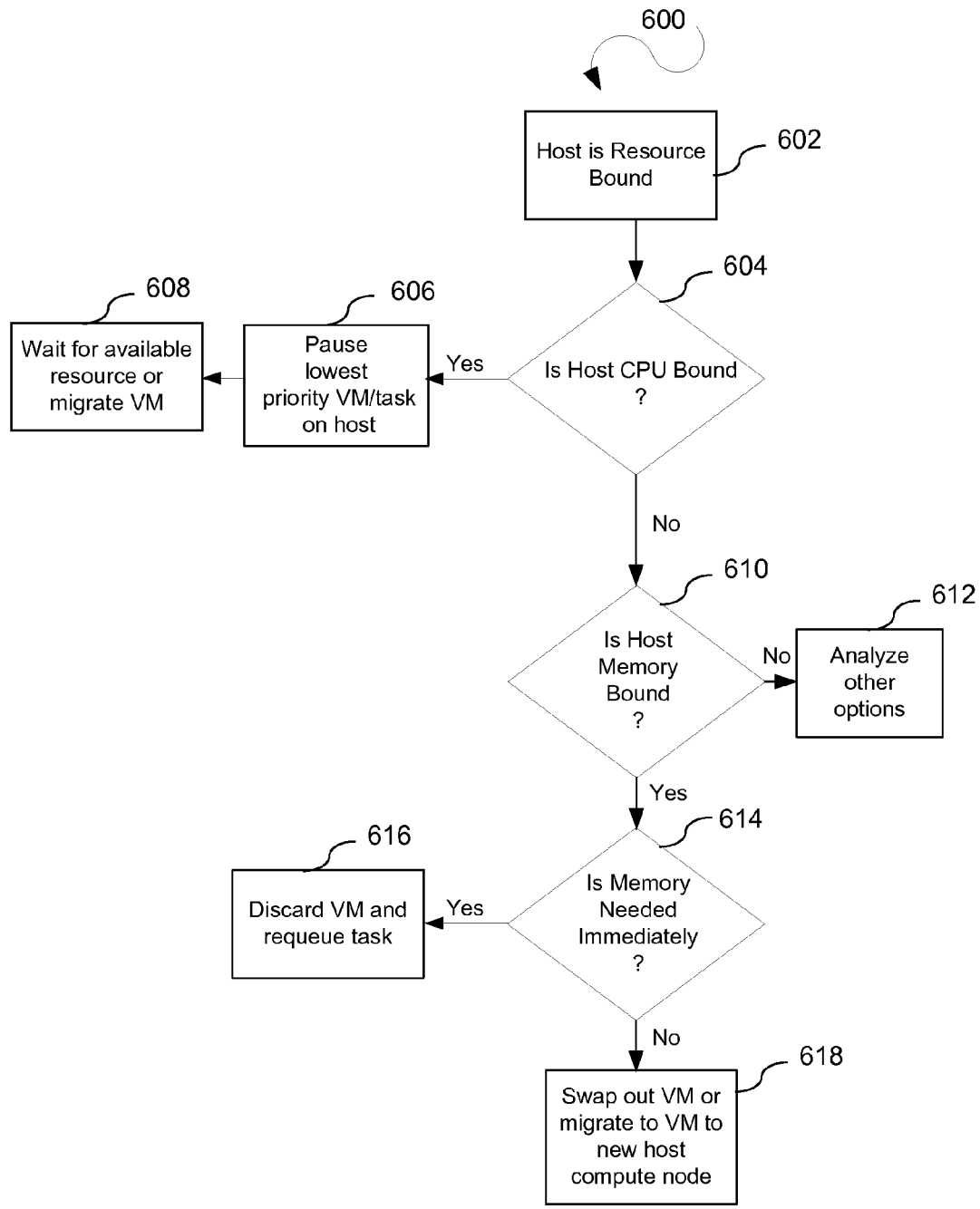
FIG. 6 illustrates a process that is utilized by the batch scheduler 108 illustrated in FIG. 1 to allocate resources if the host compute node illustrated in FIG. 2 is resource bound.

FIG. 6 illustrates a process 600 that is utilized by the batch scheduler 108 illustrated in FIG. 1 to allocate resources if the host compute node 200 illustrated in FIG. 2 is resource bound i.e., the resources (processors and/or memory) of the host compute node 200 are processing tasks at almost full capacity. At a process block 602, the process 600 determines that the host compute node 200 is resource bound. Further, at a decision block 604, the process 600 determines if the host compute node 200 is CPU bound. For example, the CPU of the host compute node 200 may be processing tasks at almost full processing capacity. If the process 600 determines at the decision block 604 that the host compute node 200 is CPU bound, the process 600 moves to a process block 606 to pause the lowest priority VM on the host compute node 200, which leads to the corresponding tasks being paused. The process 600 then moves to a process block 608 at which the process 600 waits for an available resource or migrates the VM to another compute node according to a determination by the batch scheduler 108.

If, at the decision block 604, the process 600 determines that the host compute node 200 is not CPU bound, the process 600 moves to a decision block 610 to determine if the host compute node 200 is memory bound. If the process 600 determines that the host compute node 200 is not memory bound, the process 600 moves to a process block 612 to analyze other options. If, at the decision block 610, the process 600 determines that the host compute node is memory bound, the process 600 moves to a decision block 614 to determine if memory is needed immediately. If, at the decision block 614, the process 600 determines that memory is needed immediately, the process 600 moves to a process block 616 to discard the VM and requeue the task. If, at the decision block 614, the process 600 determines that memory is not needed immediately, the process 600 swaps out the VM or migrates the VM to a new host compute node.

Instead of simply discarding a lowest priority task and requeuing the task, which results in losing work performed by the task, the process 600 attempts to determine the reason that the host compute node 200 is resource bound. Based on a determination of what is leading to the host compute node 200 being resource bound, the process 600 may take a corresponding action. If the process 600 ultimately determines that the host compute node 200 is resource bound because memory is needed immediately, the process 600 may discard and requeue the task. However, the process 600 provides alternative actions in other resource constraint instances to avoid having to discard and requeue the task. As a result, work performed by many tasks that are resource constrained may not be lost.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above. For example, a computer may be a personal computer ("PC"), laptop, smartphone, tablet device, set top box, or the like.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

We claim:

1. A computer program product comprising a non-transitory computer readable storage device having a computer readable program stored thereon, wherein the computer readable program when executed on a computer causes the computer to:

receive a task at a batch scheduler;

generate, at the batch scheduler, a virtual machine corresponding to the task;

deploy the virtual machine from the batch scheduler to a compute node;

dispatch the task from the batch scheduler to the virtual machine at the compute node so that the virtual machine performs the task;

receive, at the batch scheduler, global system information of the compute node from a hypervisor monitoring module that monitors a hypervisor running at the compute node;

monitor, with the batch scheduler, a probability of the task at the compute node exceeding a resource reservation for the virtual machine and an additional probability of one or more additional tasks at one or more additional compute nodes exceeding an additional resource reservation for one or more additional virtual machines deployed to the one or more additional compute nodes; and dynamically rebalance, with the batch scheduler, a total load of the virtual machine and the one or more additional virtual machines, based on the global system information of the compute node, the probability of the task at the compute node exceeding the resource reservation, and the probability of the one or more additional compute nodes exceeding the additional resource reservation, by reallocating the task from the virtual machine to one of the one or more additional virtual machines to optimize resource allocation during active processing of at least a portion of the total load.

2. The computer program product of claim 1, wherein the compute node is a computing device.

3. The computer program product of claim 1, wherein the computer is further caused to generate the virtual machine according to an operating system that is compatible with the compute node.

4. The computer program product of claim 1, wherein the computer is further caused to select the compute node based upon availability of resources for processing the task.

5. The computer program product of claim 1, wherein the batch scheduler receives, from a virtual machine monitoring module that monitors the virtual machine at the compute node, an indication of a change of a resource requirement.

6. The computer program product of claim 1, wherein the batch scheduler pauses the virtual machine.

7. The computer program product of claim 6, wherein the batch scheduler allocates additional resources to the virtual machine and resumes the virtual machine without a loss of work performed by the virtual machine.

8. The computer program product of claim 6, wherein the batch scheduler moves the virtual machine to an additional compute node and resumes the virtual machine at the additional compute node without any loss of work performed by the virtual machine.

9. A method comprising:
receiving a task at a batch scheduler;
generating with a processor, at the batch scheduler, a virtual machine corresponding to the task;
deploying the virtual machine from the batch scheduler to a compute node;
dispatching the task from the batch scheduler to the virtual machine at the compute node so that the virtual machine performs the task;
receiving, at the batch scheduler, global system information of the compute node from a hypervisor monitoring module that monitors a hypervisor running at the compute node;
monitoring, with the batch scheduler, a probability of the task at the compute node exceeding a resource reservation for the virtual machine and an additional probability of one or more additional tasks at one or more additional compute nodes exceeding an additional resource reservation for one or more additional virtual machines deployed to the one or more additional compute nodes; and
dynamically rebalancing, with the batch scheduler, a total load of the virtual machine and the one or more additional virtual machines, based on the global system information of the compute node, the probability of the task at the compute node exceeding the resource reservation, and the probability of the one or more additional compute nodes exceeding the additional resource reservation, by reallocating the task from the virtual machine to one of the one or more additional virtual machines to optimize resource allocation during active processing of at least a portion of the total load.

10. The method of claim 9, wherein the compute node is a computing device.

11. The method of claim 9, further comprising generating the virtual machine according to an operating system that is compatible with the compute node.

12. The method of claim 9, further comprising selecting the compute node based upon availability of resources for processing the task.

13. The method of claim 9, wherein the batch scheduler receives, from a virtual machine monitoring module that monitors the virtual machine at the compute node, an indication of a change of a resource requirement.

14. The method of claim 9, wherein the batch scheduler pauses the virtual machine.

15. The method of claim 14, wherein the batch scheduler allocates additional resources to the virtual machine and resumes the virtual machine without a loss of work performed by the virtual machine.

16. The method of claim 14, wherein the batch scheduler moves the virtual machine to an additional compute node and resumes the virtual machine at the additional compute node without any loss of work performed by the virtual machine.

17. A system comprising:
a processor having a batch scheduler that receives a task, generates a virtual machine corresponding to the task, deploys the virtual machine to a compute node, dispatches the task to the virtual machine at the compute node, receives global system information of the compute node from a hypervisor monitoring module that monitors a hypervisor running at the compute node, monitors a probability of the task at the compute node exceeding a resource reservation for the virtual machine, and an additional probability of one or more additional tasks at one or more additional compute nodes exceeding an additional resource reservation for one or more additional virtual machines deployed to the one or more additional compute nodes, and dynamically rebalances a total load of the virtual machine and the one or more additional virtual machines by reallocating the task from the virtual machine to one of the one or more additional virtual machines, based on the global system information of the compute node, the probability of the task at the compute node exceeding the resource reservation, and the probability of the one or more additional compute nodes exceeding the additional resource reservation, to optimize resource allocation during active processing of at least a portion of the total load, the compute node being a computing device at which the virtual machine performs the task.

18. A computer program product comprising a non-transitory computer readable storage device having a computer readable program stored thereon, wherein the computer readable program when executed on a computer causes the computer to:
receive, at a compute node, a virtual machine from a batch scheduler;
receive, at the compute node, a task from the batch scheduler, the task corresponding to the virtual machine;
provide, at the compute node, resources to the virtual machine to process the task;
receive global system information of the compute node from a hypervisor monitoring module that monitors a hypervisor running at the compute node; and
reallocate the task from the virtual machine to one of one or more additional virtual machines based on a dynamic rebalancing determined by the batch scheduler during active processing of the task based on the global system information of the compute node, wherein the batch scheduler monitors a probability of the task at the compute node exceeding a resource reservation for the virtual machine and an additional probability of one or more additional tasks at one or more additional compute nodes exceeding an additional resource reservation for one or more additional virtual machines deployed to the one or more additional compute nodes, wherein the dynamic rebalancing is further based on the probability of the task at the compute node exceeding the resource reservation and the probability of the one or more additional compute nodes exceeding the additional resource reservation.

19. The computer program product of claim 18, wherein the compute node is a computing device.

20. The computer program product of claim 18, wherein the compute node sends, from a virtual machine monitoring module that monitors the virtual machine at the compute node, an indication of a change of a resource requirement to the batch scheduler.

21. A method comprising:
receiving, at a compute node, a virtual machine from a batch scheduler;
receiving, at the compute node, a task from the batch scheduler, the task corresponding to the virtual machine;
providing, at the compute node, resources to the virtual machine to process the task;
receiving global system information of the compute node from a hypervisor monitoring module that monitors a hypervisor running at the compute node; and
reallocating the task from the virtual machine to one of one or more additional virtual machines based on a dynamic rebalancing determined by the batch scheduler during active processing of the task based on the global system information of the compute node,
wherein the batch scheduler monitors a probability of the task at the compute node exceeding a resource reservation for the virtual machine and an additional probability of one or more additional tasks at one or more additional compute nodes exceeding an additional resource reservation for one or more additional virtual machines deployed to the one or more additional compute nodes,
wherein the dynamic rebalancing is further based on the probability of the task at the compute node exceeding the resource reservation and the probability of the one or more additional compute nodes exceeding the additional resource reservation.

22. The method of claim 21, wherein the compute node is a computing device.

23. The method of claim 21, wherein the compute node sends, from a virtual machine monitoring module that monitors the virtual machine at the compute node, an indication of a change of a resource requirement to the batch scheduler.

* * * * *